Sept. 8, 1970  C. GUDMUNDSON  3,528,095
BOAT TRAILER
Filed April 2, 1968
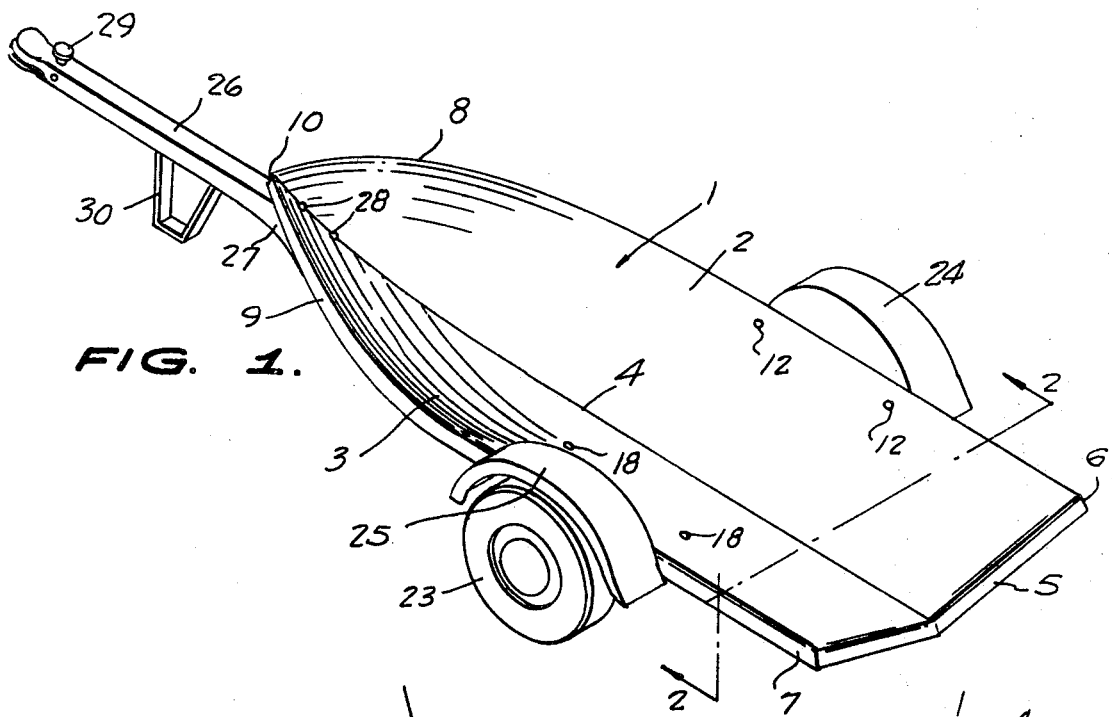
FIG. 1.
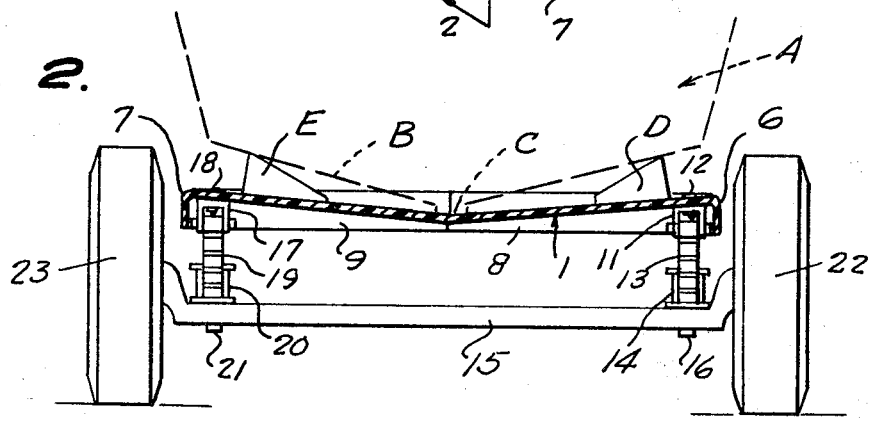
FIG. 2.
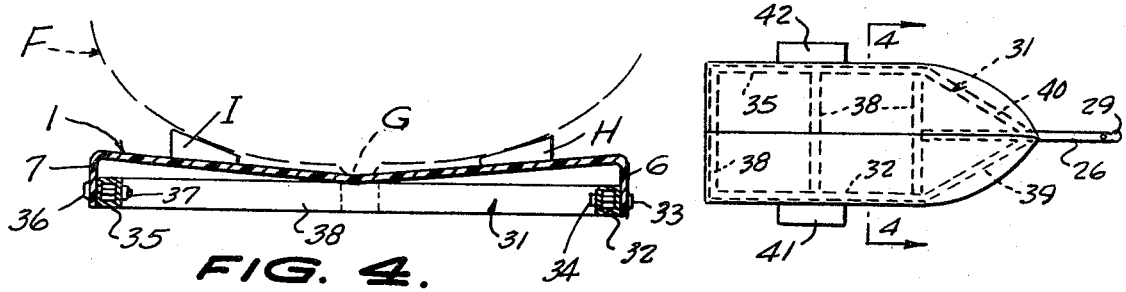
FIG. 3.
FIG. 4.
INVENTOR.
CLARK GUDMUNDSON,
BY
Linton and Linton
ATTORNEYS.

United States Patent Office 3,528,095
Patented Sept. 8, 1970

3,528,095
BOAT TRAILER
Clark Gudmundson, 267 E. 550 N.,
Bountiful, Utah 84010
Filed Apr. 2, 1968, Ser. No. 718,141
Int. Cl. B62d 53/00
U.S. Cl. 280—414     1 Claim

ABSTRACT OF THE DISCLOSURE

A towable boat trailer having a boat supporting elongated sheet whose two halves slant laterally downwardly towards one another meeting at a common crease extending on the longitudinal axis of the sheet. The side marginal portions of the sheet extend downwardly to provide side walls, adjacent which, the bottom face of the sheet is resiliently supported on a wheel axle. The side walls curve inwardly and upwardly meeting at a point on said axis, giving the sheet a cupped configuration capable of receiving a boat bottom thereon. A tow bar extends forwardly from the pointed end.

---

The present invention relates to portable and towable boat trailers and is more particularly concerned with an improvement therein.

The principal object of the present invention is to provide a towable wheeled trailer primarily for boats and which trailer has an elongated sheet of a configuration for receiving the bottom of a boat thereon and which sheet is connected to a towable bar and rotatably mounted wheels whereby the boat can be conveyed behind a motored vehicle or easily and quickly slid onto or slid off of said sheet as desired.

A further and important object of the present invention is to provide a sheet boat supporting member which can be easily and readily mounted upon a wheeled frame such as a conventional boat trailer, used or new, and which sheet provides a support for a boat when so mounted.

Further objects of the invention will be in part pointed out and in part obvious from the following discription of the accompanying drawing wherein:

FIG. 1 is a perspective view of a boat trailer in accordance with the present invention.

FIG. 2 is a cross-sectional view taken on line 2—2 of FIG. 1.

FIG. 3 is a top view of a modified form of the present invention, reduced size.

And FIG. 4 is an enlarged cross-sectional view taken on line 4—4 of FIG. 3.

Referring now more particularly to the accompanying drawing wherein like and corresponding parts are indicated by similar reference characters, numeral 1 generally indicates an elongated boat supporting sheet whose two halves 2 and 3 slant downwardly towards one another meeting at the crease 4 extending on the longitudinal axis of said sheet. Said sheet has a bent rear marginal end portion forming an end wall 5 as well as bent side marginal portions forming side walls 6 and 7 with said walls extending laterally and downwardlly from said sheet. Said side walls 6 and 7 curve inwardly and upwardly as at 8 and 9 respectively meeting in a point 10 and giving said sheet a cupped ogival configuration capable of receiving a boat bottom thereon and which due to the diverging configuration of the halves 2 and 3 assists in preventing the lateral or forward sliding of a boat A or F thereon.

A pair of links 11, only one of which is shown are fastened to sheet 1 but spaced apart longitudinally thereof, by rivets 12. A leaf spring 13 is pivotally connected at its ends to said links and mounted at its medial portion in a retainer 14 and fastened to axle 15 by a bolt 16.

Similarly, but at the opposite side of sheet 1, there are a pair of links 17 fastened to said sheet by rivets 18 and spaced apart longitudinally thereof while a leaf spring 19 is pivotally connected to links 17 at each end thereof. The medial portion of said spring 19 is seated within a retainer 20 and fastened by bolt 21 to said axle 15. However, it is to be appreciated that other spring means can equally as well be employed for supporting sheet 1 on axle 15. Wheels 22 and 23 are rotatably mounted upon the opposite ends of axle 15. Fenders 24 and 25 are attached to sheet 1 and extend over top wheels 22 and 23 respectively.

A tow bar 26 has a curved end 27 mating with the bow portion of sheet 1 and fastened thereto by rivets or bolts 28. A conventional tractor-trailer hitch 29 is mounted on the lead end of tow bar 26 and leg 30 extends downwardly from said tow bar for resting on the ground when the trailer is unhitched to prevent the excessive forward tilting thereof.

Boat A, which has a bottom B and keel C, can be slid onto or off of sheet 1 but when mounted thereon wedges D and E can be inserted beneath bottom B to retain the boat in an upright position. However, sheet 1 can be of a configuration for mating with bottom B and keel C whereby the said wedges would not be required.

In the modified form of the trailer shown in FIGS. 3 and 4, sheet 1 is positioned on and across a metal frame generally indicated at 31. The sides 32 and 35 of said frame are attached to the sides 6 and 7 respectively of sheet 1 by bolts 33 extending through wall 6 and side 32 and fastened by nuts 34 and by bolts 36 extending through wall 7 and frame side 35 and fastened by nut 37. Said frame has cross members 38 fixedly attached to sides 32 and 35 spacing the same apart while inwardly slanting sides 39 and 40 extend from sides 32 and 35 respectively beneath the pointed end of sheet 1 and tow bar 26 can be attached to said members 38–40 or to sheet 1 only or to both members 38–40 as well as sheet 1. Said frame 31 is mounted upon wheels 41 and 42 whereby the same can be towed or otherwise moved around as desired.

It is to be appreciated that frame 31 can equally as well be a conventional wheeled boat trailer without rollers or slide supports on the top thereof. That is, sheet 1 can be quickly and easily mounted upon the frame of a conventional boat trailer upon removing any any rollers or slide supports normally upon the top of such trailers by affixing side walls 6 and 7 to the frame 31 as shown in FIG. 4. Thus, sheet 1 can readily be applied to conventional trailers while in production or complete trailers, either new or used.

Sheet 1 can be one piece of material such as is employed in the hull of boats, such as A or F, to be carried by the trailer, that is, wood such as marine grade plywood, a light metal such as aluminum, or a plastic such as fiber glass. Also sheet 1 may also be made of buoyant material besides wood such as layers of plastic with cork, plywood, styrofoam, or the like therebetween or expanded Royalite produced by the U.S. Rubber Company. Sheet 1 may be molded, pressed, or otherwise formed according to the material employed and in such manners as are conventional therefore.

In the use of the present trailers, the trailer while unhitched is either tilted until end wall 5 touches the ground whereupon the boat, such as A or F for example, can be slid onto and off of sheet 1 with the keel C or G of the boat sliding along the crease 4. If the material of sheet 1 and boat A or F is the same or compatible, it has been found that such sliding readily occurs with a minimum of effort. Also, the trailer can be rolled into the water for sliding the boat on and off and if sheet 1 is of a floatable material it will partially submerge so that the boat can be placed on or off the same. For tow purposes hitch 29 is connected to a tow vehicle in a conventional manner.

If a round bottom boat F is to be mounted on sheet 1 the different types of wedge H and I suitable for supporting the boat upright can be employed. That is, the wedges can be of different configurations depending upon the shape of the boat bottom to be used therewith.

The present invention is capable of considerable modification, and such changes thereto as come within the scope of the appended claim is deemed to be a part thereof.

I claim:

1. A mobile boat trailer comprising an elongated sheet, the top face of said sheet having longitudinal half portions thereof slanting laterally downwardly towards one another to a common crease and capable of receiving a boat bottom thereon, said sheet having side marginal portions extending downwardly from said top face providing side walls, two pairs of links fastened to the bottom face of said sheet with each pair adjacent one of said side walls, two leaf springs each pivotally connected at an end to one of said links, an axle fastened to said springs, wheels rotatably carried by said axle on opposite sides of said sheet and a tow bar fastened to one end of said sheet.

References Cited

UNITED STATES PATENTS

| 2,256,038 | 9/1941 | Woodruff. | |
| 2,770,470 | 11/1956 | Halverson | 280—179 |
| 2,792,237 | 5/1957 | Paulson | 280—414 |
| 3,224,019 | 12/1965 | Gudmundson | 9—1 |
| 3,339,921 | 9/1967 | Gudmundson | 280—414 X |
| 3,360,809 | 1/1968 | Gudmundson | 280—414 X |

OTHER REFERENCES

Webster's New International Dict. (2nd Edition—Merriam Co.—1959) page 139.

LEO FRIAGLIA, Primary Examiner

U.S. Cl. X.R.

9—1; 214—505